3,198,860
METHOD FOR THE MANUFACTURE OF VINYL FLOOR COVERINGS
Ernest J. Kimmel, Mogador, and Charles O. Slemmons, Akron, Ohio, assignors to The General Tire & Rubber Company, a corporation of Ohio
Filed Mar. 16, 1962, Ser. No. 180,174
4 Claims. (Cl. 264—77)

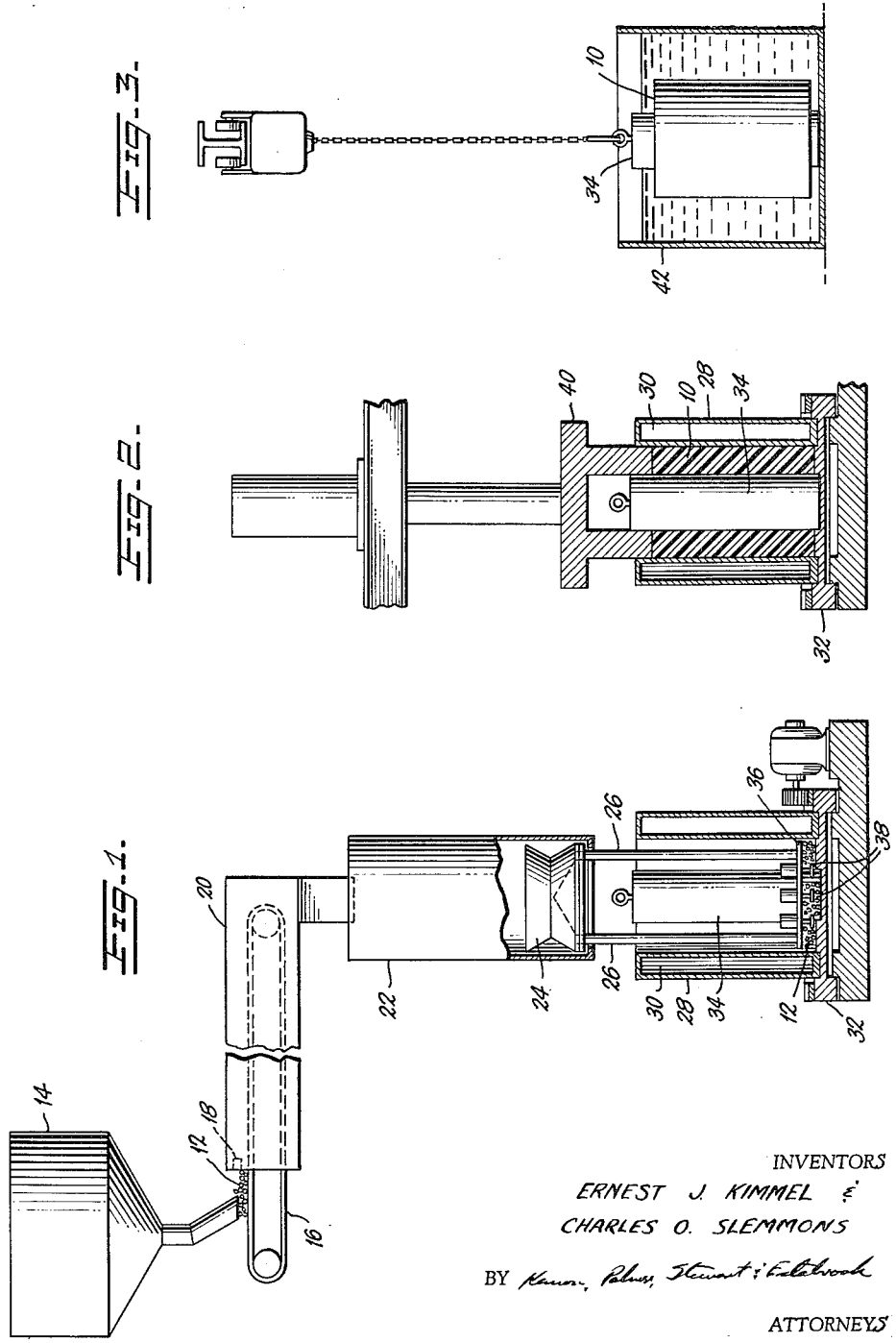

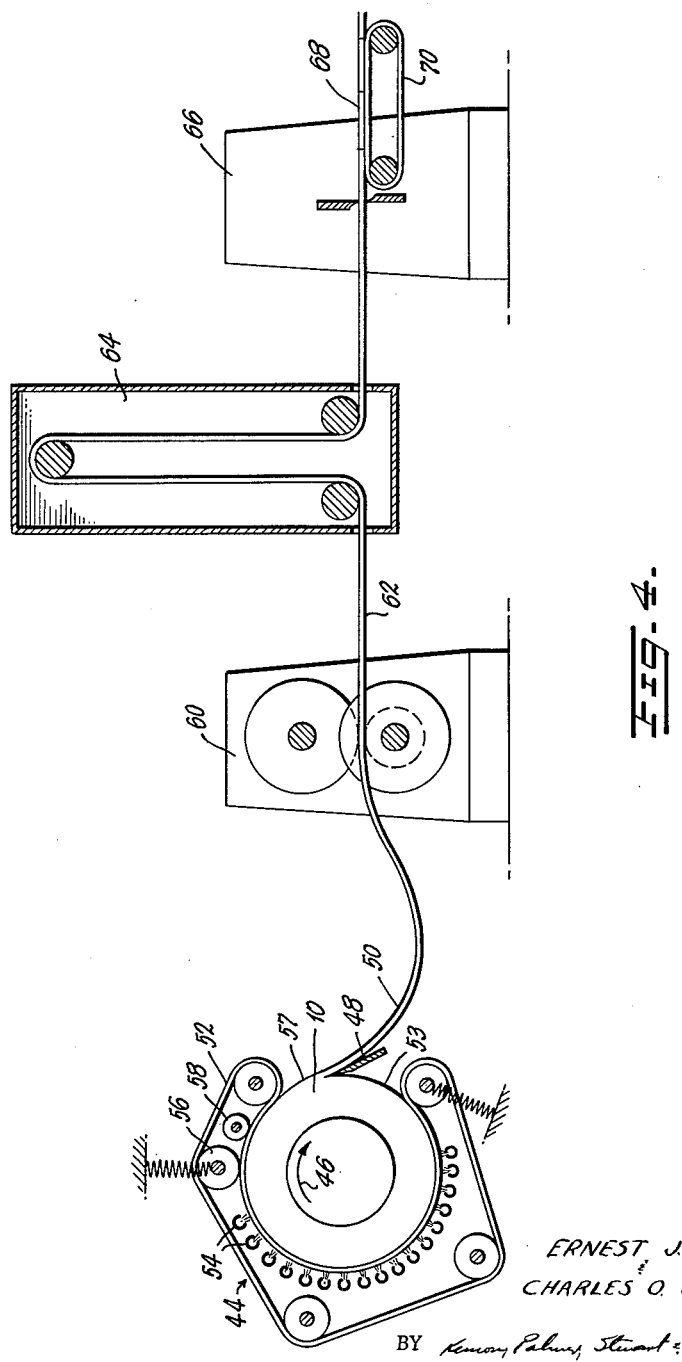

This invention relates to the manufacture of floor coverings and more particularly, it concerns a new and unique method of manufacturing multi-colored floor coverings from vinyl plastic material to simulate terrazzo, marble and the like design patterns.

The term "vinyl plastic" as used herein is intended to encompass polymers of vinyl chloride and copolymers thereof which are polymerizable under the same conditions as vinyl chloride, e.g., a copolymer of vinyl chloride and vinylidene chloride.

Prior to this invention, the production of terrazzo and similar designs in floor coverings formed from vinyl plastic involved granulating solid, vinyl plastic blocks of different colors and then fusing a mixture of the differently colored granules to achieve the terrazzo design pattern. The formation of individual floor tiles by employing this technique resulted in a satisfactory product; however, the difficulties in carrying this technique into practice resulted in extremely high costs. To illustrate, it was necessary first to load the granulated vinyl into individual tray molds in which the granules are fused by heat and pressure, unload the slabs thus formed and insert them into a hot oven. After heating, the slabs were removed from the oven, slit to the approximate desired tile thickness, placed into a polishing press and subsequently machined to achieve the final thickness. Because of the costs incident to the numerous times the material had to be handled during the formation of the tiles and loss of material in the process, considerable expense was incurred.

A principal object of the present invention therefore is to provide a unique method of manufacturing floor coverings, which method is particularly suitable to the formation of terrazzo and similar designes and by which the difficulties and resulting high costs incurred with previous methods are substantially reduced.

Another object of this invention is to provide a highly effective method by which vinyl floor coverings may be formed in a substantially continuous operation so that the time required and costs incidental to the formation of such coverings is reduced to a minimum.

A further object of this invention is the provision of a novel method of manufacturing vinyl terrazzo floor tiles in an expeditious, economical manner and by which high quality, defect-free tiles are produced.

Further object of this invention is that of providing a new and unique method of manufacturing vinyl floor coverings by which a variety of design effects may be accomplished.

Other objects and further scope of applicability of the present invention will become apparent from the detailed description given hereinafter. It should be understood, however, that the detailed description, while indicating preferred embodiments of the invention, is given by way of illustration only, since it will become apparent to those skilled in the art from the description that various changes and modifications can be made without departing from the true spirit and scope of this invention.

In general, the present invention is practiced by first molding granulated vinyl to form a dense, consolidated body having cylindrical outer surfaces. After its formation, the consolidated or compacted body of vinyl is placed into a veneer cutting machine by which a continuous web is removed from the outer cylindrical surface thereof. Preferably, the apparatus by which the veneer cutting operation is effected includes polishing means in the form of an endless belt having a smooth surface urged against the peripheral surface of the vinyl body and provided with heating means directly behind the engaging surface thereof. In this manner, the relatively rough surface remaining on the body after the veneer cutting is polished smooth by pressure contact with the smooth surface of the heated belt. Hence, the web removed from the body will receive on one side thereof, the polished surface imparted to the periphery of the body. As the sheet is removed from the consolidated body it is passed through an annealing oven to relieve the internal stresses therein and is ready for use in sheet form, if desired. Or, alternatively, if individual tiles are desired, the web will be passed through a siltter to form continuous strips of vinyl each having a width approximately equal to the width of tile desired, and through a cut-off shear to form the individual tiles in their final shape.

A more complete understanding of the present invention and the manner in which it is practiced may be had by reference to the accompanying drawings in which:

FIGS. 1, 2 and 3 illustrate schematically the formation of a dense, consolidated body of vinyl plastic from differently colored granules at successive stages of the method of this invention respectively; and FIG. 4 is a schematic view illustrating the various steps by which the body illustrated in FIGS. 1 to 3 is formed into individaul floor tiles.

Referring now to the drawings and particularly to FIGS. 1 to 3 thereof, successive steps in the formation of a consolidated body or hollow log 10 from granulated vinyl plastic 12 are depicted schematically as being performed by apparatus forming the subject matter of a copending application Serial No. 180,173, filed on March 16, 1962. The granulated vinyl plastic material 12 which has been prepared from solid blocks of vinyl plastic of different colors and mixed to achieve the desired combinations of colors is placed in a hopper 14. From the hopper, the granulated vinyl plastic is deposited on a conveyor belt 16 and spread evenly thereover such as by spreader bar 18 as it passes into a heating oven 20. In the oven 20, the granules of vinyl plastic are heated to approximately 350° F. and then passed downwardly through an insulating jacket 22, a funnel 24 having depending tubes 26 into a cylindrical mold 28. As described in the aforesaid copending application, the mold 28 is jacketed or formed having an interior chamber 30 into which a fluid such as steam or cooling water may be introduced and is supported by a rotatable table 32 to facilitate even distribution of the granulated vinyl 12 therein as it falls through the tubes 26. Also, the central portion of the mold is preferably filled by a removable core 34 about which the body or log 10 is formed. Further, the core 34 may contain a chamber to permit the introduction of heating or cooling fluid therein.

A ring 36 supported at the lower end of tube 26 carries a plurality of individually actuated tampers 38. Thus, as the heated granules of vinyl plastic pass from the conveyor belt 16 and oven 20 downwardly into the mold 28 they are deposited into the mold at the approximate temperature of 350° F. to which they are heated in the oven 20 and simultaneously tamped by the tampers 38 both for the purpose of eliminating air from the vinyl plastic material in the mold and also that the volume of granulated vinyl in the mold will be kept at a minimum prior to the fusing step. Also, to maintain the proper temperature of the vinyl plastic in the mold 28 heating fluid such as steam may be introduced both into the core 34 and the chamber 30 in the mold 28.

After the mold is filled to the desired level with the heated, granulated vinyl plastic, it is transferred to a pressing station illustrated schematically in FIG. 2 of the drawings. At this station, a press 40 is applied axially to the annulus of vinyl plastic about the core 34 and a pressure of approximately 1,000 p.s.i. is applied thereto. Immediately upon the application of this compressive force, cooling fluid is introduced into the chamber 30 and into the core 34 to reduce the temperature of the vinyl plastic now in the form of the hollow log 10 since the individual granules have been firmly compacted and fused. When the log 10 has partially cooled, it is removed from the mold 28 and introduced into a cooling tank 42 as shown in Fig. 3 for further cooling. The log or annular body 10 thus formed will constitute a dense, consolidated body of vinyl plastic material from which substantially all voids and defects have been removed. However, the color pattern established by mixing different color granules of the vinyl is it is introduced into the hopper 14 will be retained so that in cross-section, the color pattern will resemble quite closely a terrazzo pattern. Other patterns are possible merely by controlling the amounts of different colored granules as well as their order of introduction into the mold.

The body 10 having a cylindrical outer surface is placed into a combination polishing and veneer cutting machine illustrated schematically at 44 in Fig. 4 of the drawings and which forms the subject matter of a copending application Serial No. 180,175 filed March 16, 1962. In the machine 44, the body 10 is rotated in the direction of the arrow 46 against a veneering blade 48 so that a thin, uniformly dimensionel web 50 is continuously separated from the periphery of the body. An endless polishing belt 52 is disposed about the body 10 so as to exert pressure radially against the cut surface 53 of the body formed by rotation thereof past the veneering blade 48. Also, that portion of the belt in contact with the body is heated by gas heaters 54, or other suitable heating means, and followed by a pressure roll 56. The pressure roll is resiliently urged inwardly against the periphery of the body after heating to impart a smooth polished surface 57 thereto. Thus, any roughness imparted to the cut surface 53 by the blade 48 is removed by contact thereof with the smooth surfaced belt and upon passing the pressure roll 56 after heating the smooth, polished surface 57 is formed. This smooth surface becomes part of the web 50 since the knife 48 follows the roll 56. Also, if desired, the temperature of the outer cylindrical periphery of the log or body 10 may be reduced by a cooling roll 58 since the temperature at which the veneer cutting takes place may be less than that required for polishing.

The web 50 passing from the body 10 is of exceptional quality both from the standpoint of physical and design characteristics. The step by which the heated granules of vinyl are tamped as they are deposited in the mold 28, compressed and cooled results in a dense, void-free mass in the form of the annular body 10. These steps, combined with the polishing step, greatly enhance the physical qualities of the web. Furthermore, these steps enable the achievement of superior terrazzo patterns in the web. This result obtains first, because direction of cutting the web tangentially from the cylinder shaped body is at right angles both to the axial pressure exerted on the vinyl during formation of the body 10 and to the radial pressure by the belt 52 and pressure roll 56 during polishing so that color smear is substantially eliminated. Secondly, by controlled placement of the granules of vinyl into the mold 28 by color, various other unique patterns such as marble simulating patterns, can be achieved.

After separation from the periphery of the log 10, the web 50 is passed through a slitter 60 wherein strips 62 of vinyl plastic are formed having a width approximately that of the width of tile desired. The strips 62 are then passed through an annealing oven 64 and thence through a transverse cutter 66. Upon leaving the cutter 66 the vinyl material, now in the form of tiles 68, is fed outwardly on a discharge conveyor 70 for subsequent packaging.

Although the process of this invention is particularly suited to the manufacture of individual floor tiles in the manner described above, it is contemplated that sheet type floor coverings may be formed also thereby. For example, such a sheet type covering could be formed merely by omitting the slitting step and passing the polished web 50 directly through the annealing oven 64. The sheet thus formed would be cut off to the desired length by a machine similar to the transverse cutter 66.

Also, the achievement of the polished web by polishing the cut surface 53 of the body periphery prior to separation of the web from the body is preferred. However, the polishing step may be applied to the web after severance thereof from the annular body 10. As will be understood by those familiar in this art, this alternative might be accomplished by passing the web continuously through a polishing machine which is separate from and following the veneer cutting machine.

Thus, it will be apparent from the above given description that by this invention, a highly improved method and apparatus is provided for use in the manufacture of vinyl floor and wall coverings, particularly terrazzo type floor tiles, and that the above stated objectives are completely fulfilled thereby. Moreover, many variations in the present invention will now be apparent to those skilled in the art. The foregoing description, therefore, is intended to illustrate preferred forms only, the true spirit and scope of the invention encompassing other forms and to be established by the appended claims.

We claim:

1. A method of manufacturing vinyl terrazzo floor tile comprising the steps of:
    (a) forming a consolidated body having a cylindrical peripheral surface from mixed colored granules of vinyl plastic;
    (b) polishing the peripheral surface of said body; and
    (c) continuously removing a web from the polished peripheral surface of said log.

2. A method of manufacturing terrazo vinyl floor covering comprising the steps of:
    (a) forming a dense, consolidated body having a cylindrical, peripheral surface from differently colored granules of vinyl plastic material by
        (1) heating the vinyl plastic granules,
        (2) depositing the heated granules in a mold,
        (3) compressing the granules while they are still hot to form a solid mass,
        (4) removing the body from the mold and,
        (5) cooling the body;
    (b) continuously polishing the peripheral surface of said body; and
    (c) continuously severing and removing a web from the peripheral surface of said body at a point following the point of body polishing.

3. The method recited in claim 2 including further, the step of cutting said polished web into individual floor tiles.

4. The method recited in claim 2 in which the granules are compressed axially of the body.

(References on following page)

References Cited by the Examiner

UNITED STATES PATENTS

| | | | |
|---|---|---|---|
| 2,163,372 | 6/39 | Claxton et al. | 156—187 |
| 2,406,127 | 8/46 | Alfthan. | |
| 2,434,541 | 1/48 | Bierer. | |
| 2,442,598 | 6/48 | Harrison et al. | 18—56 |
| 2,456,262 | 12/48 | Fields | 18—55 |
| 2,781,552 | 2/57 | Gray | 18—55 |
| 2,837,772 | 6/58 | Deakin | 18—55 |
| 2,960,727 | 11/60 | Bradshaw et al. | 18—55 |

ROBERT F. WHITE, *Primary Examiner.*

MORRIS LIEBMAN, *Examiner.*